United States Patent
Sakata et al.

(10) Patent No.: US 10,066,337 B2
(45) Date of Patent: Sep. 4, 2018

(54) FIBER TREATMENT AGENT, CARBON FIBERS TREATED WITH FIBER TREATMENT AGENT, AND CARBON FIBER COMPOSITE MATERIAL CONTAINING SAID CARBON FIBERS

(71) Applicant: SUMITOMO SEIKA CHEMICALS CO., LTD., Kako-gun (JP)

(72) Inventors: Jun Sakata, Himeji (JP); Taiji Matsukawa, Himeji (JP); Hirotsugu Kawata, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 1 day.

(21) Appl. No.: 14/768,543

(22) PCT Filed: Mar. 6, 2014

(86) PCT No.: PCT/JP2014/055807
§ 371 (c)(1),
(2) Date: Aug. 18, 2015

(87) PCT Pub. No.: WO2014/136888
PCT Pub. Date: Sep. 12, 2014

(65) Prior Publication Data
US 2016/0032520 A1 Feb. 4, 2016

(30) Foreign Application Priority Data
Mar. 6, 2013 (JP) .................... 2013-044472

(51) Int. Cl.
*D06M 15/59* (2006.01)
*C08J 5/06* (2006.01)
*C08K 9/08* (2006.01)
*D06M 15/53* (2006.01)
*D06M 101/40* (2006.01)

(52) U.S. Cl.
CPC .......... *D06M 15/59* (2013.01); *C08J 5/06* (2013.01); *C08K 9/08* (2013.01); *D06M 15/53* (2013.01); *C08J 2377/00* (2013.01); *C08J 2377/02* (2013.01); *C08J 2477/00* (2013.01); *D06M 2101/40* (2013.01); *D06M 2200/12* (2013.01)

(58) Field of Classification Search
CPC ...... C08J 5/06; C08J 5/10; C09K 9/04; C09K 9/08

USPC ......................................................... 524/538
See application file for complete search history.

(56) References Cited

U.S. PATENT DOCUMENTS

| | | | | |
|---|---|---|---|---|
| 2,339,237 A | * | 1/1944 | Brubaker | C08L 77/06 273/DIG. 6 |
| 6,794,022 B2 | | 9/2004 | Fujiwara | |
| 7,135,516 B2 | | 11/2006 | Sugiura | |
| 7,334,974 B2 | * | 2/2008 | Matsuo | C08G 18/3281 411/258 |
| 9,834,650 B2 | * | 12/2017 | Ohtani | C08J 5/06 |
| 2002/0037400 A1 | | 3/2002 | Fujiwara | |
| 2004/0197555 A1 | | 10/2004 | Sugiura | |
| 2005/0049340 A1 | | 3/2005 | Matsuo | |
| 2009/0226728 A1 | * | 9/2009 | Onoe | C08F 255/00 428/413 |
| 2014/0227516 A1 | * | 8/2014 | Hashimoto | D06M 15/263 428/367 |
| 2017/0349720 A1 | * | 12/2017 | Hiasa | C08J 5/24 |

FOREIGN PATENT DOCUMENTS

| | | | |
|---|---|---|---|
| JP | S60-221346 | 11/1985 | |
| JP | H02-84577 | 3/1990 | |
| JP | 09-228248 A * | 9/1997 | ............ D06M 15/00 |
| JP | 2001-214334 A1 | 8/2001 | |
| JP | 2001-347602 A1 | 12/2001 | |
| JP | 2002-317384 A1 | 10/2002 | |
| JP | 2004-360164 A1 | 12/2004 | |
| JP | 2005-105192 A1 | 4/2005 | |
| JP | 2012-41658 A1 | 3/2012 | |
| WO | WO 03/012188 A1 | 2/2003 | |
| WO | WO 03/036105 A1 | 5/2003 | |

OTHER PUBLICATIONS

Machine translation of JP 09-228248 A, published Sep. 1997, Kobayashi et al.*
International Search Report for International Application No. PCT/JP2014/055807 dated Jun. 3, 2014.

* cited by examiner

*Primary Examiner* — Jane L Stanley
(74) *Attorney, Agent, or Firm* — Kratz, Quintos & Hanson, LLP

(57) ABSTRACT

An object of the present invention is to provide a fiber treatment agent that is capable of forming on fibers a film that has excellent water resistance and excellent adhesion to a matrix resin. The present invention provides a fiber treatment agent comprising an aqueous medium, a water-insoluble polyamide dispersed in the aqueous medium, and a water-soluble polyamide that is present in an amount of 2 to 50 parts by mass per 100 parts by mass of the water-insoluble polyamide.

15 Claims, No Drawings

FIBER TREATMENT AGENT, CARBON FIBERS TREATED WITH FIBER TREATMENT AGENT, AND CARBON FIBER COMPOSITE MATERIAL CONTAINING SAID CARBON FIBERS

TECHNICAL FIELD

The present invention relates to a fiber treatment agent, carbon fibers treated with the fiber treatment agent, and a carbon fiber composite material comprising the carbon fibers.

BACKGROUND ART

Many types of fibers exist and find a variety of applications ranging from domestic garments to the field of space science. Fibers in various forms contribute to the development of industry. For example, fibers can be roughly classified into organic fibers, such as natural fibers obtained from plants and animals, synthetic fibers obtained by synthesizing organic chemical substances, semi-synthetic fibers, and regenerated fibers; and inorganic fibers, such as carbon fibers obtained by carbonizing, for example, an acrylic fiber or pitch as a starting material at a high temperature, glass fibers, metal fibers, and rock fibers.

Among these fibers, in particular, carbon fibers, which are lightweight and have mechanical properties of being very strong and highly elastic, are combined with a matrix resin and used as a fiber reinforced matrix composite.

Carbon fibers, which are typically composed of monofilaments having a diameter of several microns, have low elongation and thus easily fluff due to mechanical friction, etc. and are often difficult to handle. Therefore, carbon fibers are usually sized with a fiber treatment agent and used (see PTL 1 and 2). A fiber treatment agent enhances the bundling properties of carbon fibers, and a sizing treatment using a fiber treatment agent may also improve the physical properties of carbon fibers or carbon fiber bundles. Furthermore, the treatment agent present on the surface of carbon fibers can enhance the compatibility with a matrix resin and increases the adhesion of the interface between the matrix resin and carbon fibers.

Matrix resins that are combined with carbon fibers can be roughly classified into thermosetting resins and thermoplastic resins. When a thermoplastic resin is used as the matrix resin, a high toughness composite material can be easily obtained, compared to the use of a thermosetting resin, with excellent thermal processability as well, thus having a high utilization value.

Examples of fiber treatment agents that enhance compatibility with such a thermoplastic resin include polyamide-containing treatment agents. Carbon fibers treated with a polyamide-containing treatment agent for fibers have excellent compatibility with various thermoplastic resins, such as polyamides, polyesters, polyethylenes, and polycarbonates.

Examples of such polyamide-containing fiber treatment agents include those comprising water-soluble polyamides (see PTL 3, 4, and 5). These treatment agents are not only highly soluble in water but also impart sufficient bundling properties to shape carbon fibers and allow the resulting carbon fiber bundles to be uniformly dispersed in water. Therefore, such treatment agents can be preferably used to uniformly disperse carbon fibers in an inorganic matrix slurry, such as concrete. However, water-soluble polyamides, which originally have the property of being soluble in water, absorb a greater amount of moisture in the air than common water-insoluble polyamides and may impart tackiness to the carbon fiber bundle surface with time, thus impairing the processability of carbon fiber bundles. Further, when carbon fiber bundles are adhered to a matrix resin to form a composite material, delamination tends to occur due to the influence of moisture absorbed by the treatment agent, and mechanical properties, such as strength and flexural elasticity, and durability of the molded product may deteriorate. Accordingly, in applications in which the treatment agent tends to be in contact with water or air, usable ranges may be limited.

To improve the water resistance of such water-soluble polyamides, a method comprising crosslinking a water-soluble polyamide with a curing agent, such as blocked isocyanate, to make the polyamide insoluble in water (see PTL 5), and a method comprising heating until a water-soluble polyamide is self-crosslinked to be insoluble in water (see PTL 6) are known. However, when a crosslinking method is used, a functional group (e.g., a carboxyl, amino, or hydroxyl group), which is present on the carbon fiber interface and which helps to improve the adhesion through a hydrogen bond to the matrix resin, reacts. This reduces the functions of the functional group and may lower the adhesion. The heat treatment method may also thermally degrade polyamides and matrix resins.

It is also known that a water-insoluble polyamide, such as copolymer nylon, is dispersed in the form of particles in water and the resulting aqueous polyamide resin dispersion is used as a fiber treatment agent (see PTL 7).

When such a water-insoluble polyamide resin (water-insoluble polyamide) is formed into an aqueous dispersion and used as a fiber treatment agent, the fiber treatment agent has higher water resistance than a fiber treatment agent comprising a water-soluble polyamide, and thus can be used in applications for which water-soluble polyamides are unsuitable.

Compared to using a water-soluble polyamide resin or like solution as a fiber treatment agent, aqueous polyamide resin dispersion-type fiber treatment agents can more firmly fix the resin on the surface of carbon fibers or in the voids of carbon fiber bundles. This can greatly improve the heat resistance and physical properties of the carbon fibers or carbon fiber bundles. Accordingly, in particular, there has recently been an increasing demand for aqueous dispersion-type fiber treatment agents.

However, compared to using a water-soluble polyamide, the use of a water-insoluble copolymer nylon or like polyamide generally results in slightly poor adhesion to a matrix resin, partly due to the strong crystallinity of the resin. Accordingly, adhesion improvement has been desired.

CITATION LIST

Patent Literature

PTL 1: JP2001-214334A
PTL 2: JP2004-360164A
PTL 3: WO2003/012188
PTL 4: JP2012-41658A
PTL 5: JP2001-347602A
PTL 6: JPS60-221346A
PTL 7: JP2005-105192A

SUMMARY OF INVENTION

Technical Problem

An object of the present invention is to provide a fiber treatment agent that is capable of forming on fibers a film that has excellent water resistance and excellent adhesion to a matrix resin. Another object of the present invention is to provide carbon fibers treated with the fiber treatment agent, and a carbon fiber composite material comprising the carbon fibers.

Solution to Problem

The present inventors conducted extensive research to achieve the above object and found that a fiber treatment agent comprising an aqueous medium, a water-insoluble polyamide dispersed in the aqueous medium, and a water-soluble polyamide that is present in an amount of 2 to 50 parts by mass per 100 parts by mass of the water-insoluble polyamide can form on fibers a film that has excellent water resistance and excellent adhesion to a matrix resin. The present inventors further found that the treated carbon fibers and a matrix resin can form a carbon fiber composite material that has good mechanical properties. The present inventors have achieved the present invention with further improvements based on these findings.

Specifically, the present invention encompasses, for example, the subjects described in the following items.
Item 1.
A fiber treatment agent comprising an aqueous medium, a water-insoluble polyamide dispersed in the aqueous medium, and a water-soluble polyamide that is present in an amount of 2 to 50 parts by mass per 100 parts by mass of the water-insoluble polyamide.
Item 2.
The fiber treatment agent according to Item 1, wherein the water-insoluble polyamide is at least one member selected from the group consisting of nylon 6, nylon 66, nylon 610, nylon 11, nylon 12, nylon 6/66 copolymer, nylon 6/610 copolymer, nylon 6/11 copolymer, nylon 6/12 copolymer, nylon 6/66/11 copolymer, nylon 6/66/12 copolymer, nylon 6/66/11/12 copolymer, nylon 6/66/610/11/12 copolymer, dimer acid-based polyamide resins, and nylon elastomers.
Item 3.
The fiber treatment agent according to Item 1 or 2, wherein the dispersed water-insoluble polyamide has a mean particle size of 0.05 to 20 µm.
(The particle size of water-soluble polyamides cannot be measured by the laser diffraction particle size distribution measurement method as described below in detail. Accordingly, when the mean particle size of polyamide particles contained in the fiber treatment agent of the present invention is determined by the laser diffraction particle size distribution measurement method, the obtained value refers to the mean particle size of the water-insoluble polyamide dispersed in the fiber treatment agent of the present invention. Accordingly, the fiber treatment agent according to Item 3 can be paraphrased as "the fiber treatment agent according to Item 1 or 2, wherein the polyamide as dispersed in the fiber treatment agent has a mean particle size of 0.05 to 20 µm.")
Item 4.
The fiber treatment agent according to any one of Items 1 to 3, wherein the water-soluble polyamide comprises a tertiary amine component or a polyalkylene glycol component in its molecular chain.
Item 5.
The fiber treatment agent according to any one of Items 1 to 4, wherein the water-insoluble polyamide and the water-soluble polyamide have glass transition temperatures with a difference that is not more than 100° C.

Item 6.
The fiber treatment agent according to any one of Items 1 to 5, which, upon drying, forms a film that is water-resistant.
Item 7.
The fiber treatment agent according to any one of Items 1 to 6, which is a treatment agent for carbon fibers.
Item 8.
A method for producing a fiber treatment agent (preferably the fiber treatment agent according to any one of Items 1 to 7), comprising adding a water-soluble polyamide to an aqueous dispersion of a water-insoluble polyamide at a temperature of 70° C. or lower.
Item 9.
A carbon fiber treated with the fiber treatment agent according to any one of Items 1 to 7.
Item 10.
A method for producing a carbon fiber treated with a fiber treatment agent, comprising treating the carbon fiber with the fiber treatment agent according to any one of Items 1 to 7 at a temperature of 200° C. or lower.
Item 11.
A carbon fiber composite material comprising the carbon fiber according to Item 9 and a matrix resin.

The fiber treatment agent according to Item 1 may be paraphrased, for example, as follows:
"a fiber treatment agent comprising an aqueous medium, a water-insoluble polyamide, and a water-soluble polyamide, the water-insoluble polyamide being dispersed in the aqueous medium, and the water-soluble polyamide being present in an amount of 2 to 50 parts by mass per 100 parts by mass of the water-insoluble polyamide."

Advantageous Effects of Invention

The fiber treatment agent of the present invention comprises an aqueous medium, a water-insoluble polyamide dispersed in the aqueous medium, and a water-soluble polyamide that is present in an amount of 2 to 50 parts by mass per 100 parts by mass of the water-insoluble polyamide. Therefore, when fibers (in particular, carbon fibers) are treated with this fiber treatment agent, the treated fibers have excellent adhesion to a matrix resin and a film that has excellent water resistance can be formed on the fibers.

DESCRIPTION OF EMBODIMENTS

The fiber treatment agent of the present invention is described in detail below.

The fiber treatment agent of the present invention comprises an aqueous medium, a water-insoluble polyamide dispersed in the aqueous medium, and a water-soluble polyamide that is present in an amount of 2 to 50 parts by mass per 100 parts by mass of the water-insoluble polyamide.

Water is preferable as the aqueous medium. Various types of water, such as tap water, industrial water, ion-exchanged water, deionized water, and pure water, may be used. Deionized water and pure water are particularly preferable. In the fiber treatment agent of the present invention, pH adjusters, viscosity modifiers, antifungal agents, etc., may be added to the water, if necessary, as long as the object of the present invention is not impaired.

Known polyamides or polyamides produced by known methods may be used as the water-insoluble polyamide of the present invention. Commercially available polyamides may also be used.

Specific examples of water-insoluble polyamides that can be used in the present invention include water-insoluble polyamides produced by polycondensation of diamine and dicarboxylic acid, polylcondensation of ω-amino-ω'-carboxylic acid, ring opening polymerization of cyclic lactam, and the like. That is, specific examples include water-insoluble polyamides obtained by polycondensing diamine and dicarboxylic acid, water-insoluble polyamides obtained by polycondensing ω-amino-ω'-carboxylic acid, water-insoluble polyamides obtained by ring opening polymerization of cyclic lactam, and the like. In the polycondensation or ring opening polymerization, a dicarboxylic acid or monocarboxylic acid may be used as a polymerization regulator.

Examples of diamines include ethylenediamine, trimethylenediamine, tetramethylenediamine, pentamethylene diamine, hexamethylenediamine, 1,7-diaminoheptane, 1,8-diaminooctane, 1,9-diaminononane, 1,10-diaminodecane, phenylenediamine, metaxylylenediamine, and the like.

Examples of dicarboxylic acids include glutaric acid, adipic acid, pimelic acid, suberic acid, azelaic acid, sebacic acid, nonanedicarboxylic acid, decanedicarboxylic acid, tetradecanedicarboxylic acid, octadecanedicarboxylic acid, fumaric acid, phthalic acid, xylylene dicarboxylic acid, dimer acids ($C_{36}$ unsaturated dicarboxylic acids synthesized from unsaturated fatty acids comprising linoleic acid or oleic acid as a main component), and the like.

Examples of ω-amino-ω'-carboxylic acids include 6-aminocaproic acid, 7-aminoheptanoic acid, 9-aminononanoic acid, 11-aminoundecanoic acid, 12-aminododecanoic acid, and the like.

Examples of cyclic lactams include ε-caprolactam, ω-enantholactam, ω-lauryllactam, and the like.

Examples of dicarboxylic acids that can be used as the polymerization regulator are the same as the dicarboxylic acids that can be used to produce the aforementioned polyamide resins. Specific examples include glutaric acid, adipic acid, pimelic acid, suberic acid, azelaic acid, sebacic acid, nonanedicarboxylic acid, decanedicarboxylic acid, tetradecanedicarboxylic acid, octadecanedicarboxylic acid, fumaric acid, phthalic acid, xylylene dicarboxylic acid, dimer acids, and the like. Examples of monocarboxylic acids include caproic acid, heptanoic acid, nonanoic acid, undecanoic acid, dodecanoic acid, and the like.

Among the water-insoluble polyamides, water-insoluble polyamides comprising at least one member selected from the group consisting of —[NH(CH$_2$)$_5$CO]—, —[NH(CH$_2$)$_6$NHCO(CH$_2$)$_4$CO]—, —[NH(CH$_2$)$_6$NHCO(CH$_2$)$_8$CO]—, —[NH(CH$_2$)$_{10}$CO]—, —[NH(CH$_2$)$_{11}$CO]—, and —[NH(CH$_2$)$_2$NHCO-D-CO]— (wherein D represents an unsaturated hydrocarbon having 34 carbon atoms) as a structural unit are particularly preferable in the present invention.

Examples of water-insoluble polyamides include nylons. Specific examples include nylon 6, nylon 66, nylon 610, nylon 11, nylon 12, nylon 6/66 copolymer, nylon 6/610 copolymer, nylon 6/11 copolymer, nylon 6/12 copolymer, nylon 6/66/11 copolymer, nylon 6/66/12 copolymer, nylon 6/66/11/12 copolymer, nylon 6/66/610/11/12 copolymer, and the like. These nylons are known and can be easily produced by known methods. To allow persons skilled in the art to easily understand, the slash (/) is used herein to show that each nylon is formed by copolymerizing components separated by a slash (/). For example, nylon 6/66 copolymer refers to a nylon formed by copolymerizing nylon 6 and nylon 66 as components.

Examples of water-insoluble polyamides that can be used in the present invention include dimer acid-based polyamides and polyamide elastomers. Specific examples of polyamide elastomers include copolymers of nylon and polyester, and copolymers of nylon and polyalkylene ether glycol. Examples of polyalkylene ether glycols include polyethylene oxide glycol, polypropylene oxide glycol, polytetramethylene oxide glycol, polyhexamethylene oxide glycol, and the like.

The water-insoluble polyamides may be used singly or in a combination of two or more.

The water-insoluble polyamide and water-soluble polyamide of the present invention are defined as follows. After a polyamide solid having a water content of less than 0.5% or having the water content adjusted to less than 0.5% by vacuum drying at 80° C. for 10 to 120 hours (degree of vacuum: 1,013 hpa) is immersed (allowed to stand) in deionized water in an amount of 100 parts by mass per 10,000 parts by mass of deionized water at 80° C. for 8 hours, the deionized water is filtered through a filter member (e.g., a filter paper or a filter cloth). The obtained filtrate is vacuum dried (degree of vacuum: 1,013 hpa) at 80° C. for 72 hours, and the mass of eluted polyamide is measured. With the mass of the polyamide before immersion in deionized water being defined as 100, when the mass of the eluted polyamide is less than 10, such a polyamide is defined as a water-insoluble polyamide. When the mass of the eluted polyamide is 90 or more, such a polyamide is defined as a water-soluble polyamide.

Known polyamides or polyamides produced by known methods can be used as the water-soluble polyamide of the present invention. Examples include water-soluble polyamides comprising a tertiary amine component or a polyalkylene glycol component in the molecular chain. Polyamides comprising at least one tertiary amine in the main chain and/or side chain(s) or at least one polyalkylene glycol component in the main chain are particularly preferable.

The water-soluble polyamide comprising a tertiary amine component in the molecular chain can be obtained, for example, by introducing a cyclic nitrogen compound comprising a tertiary amine component into a polyamide. Examples of the cyclic nitrogen compound for introducing a tertiary amine into the molecular main chain include aminoethylpiperazine, bisaminopropylpiperazine, and the like. Examples of the cyclic nitrogen compound for introducing a tertiary amine into a molecular side chain include α-dimethylamino-ε-caprolactam, and the like.

Examples of the compound for introducing a polyalkylene glycol component in the molecular chain include polyethylene glycol, polypropylene glycol, and the like. Polyethylene glycol is preferable because it is water-soluble at ordinary temperatures.

Nylons can be mentioned as examples of the polyamide into which a cyclic nitrogen compound comprising a tertiary amine component or a polyalkylene glycol is introduced. Specific examples include nylon 6, nylon 66, nylon 610, nylon 11, nylon 12, nylon 6/66 copolymer, nylon 6/610 copolymer, nylon 6/11 copolymer, nylon 6/12 copolymer, nylon 6/66/11 copolymer, nylon 6/66/12 copolymer, nylon 6/66/11/12 copolymer, and nylon 6/66/610/11/12 copolymer. These may be used singly or in a combination of two or more.

To introduce a polyalkylene glycol component into a polyamide molecular chain, a diamine compound obtained by modifying both ends of a polyalkylene glycol (e.g., polyethylene glycol or polypropylene glycol) with amino groups, or a dicarboxylated compound obtained by modifying both ends of a polyalkylene glycol with carboxylic acids is used.

As a compound for introducing a polyalkylene glycol component into the molecular chain, examples of the diaminated compound include bisaminopropyl polyethylene glycol and the like, and example of the dicarboxylated compound include bis(carboxy)ethylene glycol and the like. When a diamine compound as mentioned above is used to introduce a polyalkylene glycol component into a polyamide molecular chain, a substantially equimolar amount of a dicarboxylic acid is preferably used. Examples of the dicarboxylic acid include adipic acid, sebacic acid, dodecadicarboxylic acid, terephthalic acid, isophthalic acid, and the like. When a dicarboxylated compound as mentioned above is used to introduce a polyalkylene glycol component into a polyamide molecular chain, a substantially equimolar amount of a diamine is preferably used. Examples of the diamine include aliphatic diamines, such as hexamethylenediamine; alicyclic diamines, such as paraaminocyclohexylmethane; aromatic diamines, such as metaxylylenediamine; and the like.

Commercially available products may be purchased and used as the water-soluble polyamide comprising a tertiary amine component or a polyalkylenen glycol component in the molecular chain. Examples of commercially available products that can be preferably used include the AQ nylon series produced by Toray Industries, Inc. Such water-soluble polyamides and methods for production thereof are known and disclosed, for example, in JP2007-231087A. Accordingly, such a water-soluble polyamide can also be produced with reference to this publication.

Examples of the water-soluble polyamide that can be used in the present invention include, in addition to those mentioned above, N-methoxymethylated nylon, which is also called "type 8 nylon," and which is obtained by reacting nylon with formaldehyde and methanol to modify the nylon, and replacing the hydrogen of the amide bond with a methoxymethyl group, and polymers obtained by adding a hydrophilic vinyl monomer to an alcohol-soluble nylon, such as N-alkoxymethylated nylon (e.g., N-ethoxymethylated nylon and N-butoxymethylated nylon) and polymerizing the nylon (thereby imparting water-solubility higher than the starting alcohol-soluble nylon). Examples of hydrophilic vinyl monomers include acrylic acid, methacrylic acid, hydroxyethyl acrylate, hydroxyethyl methacrylate, itaconic acid, acrylamide, N-methylolacrylamide, and the like.

Commercially available products can be purchased and used as the water-soluble polyamide produced by modifying N-alkoxymethylated nylon as mentioned above. Examples of commercially available products that can be preferably used include the Toresin series produced by Nagase ChemteX Corporation.

In the fiber treatment agent of the present invention, a water-soluble polyamide comprising a tertiary amine component and a polyalkylene glycol component in the molecular chain is preferably used because the fiber treatment agent comprising such a polyamide forms a film with excellent adhesion and also has high standing stability as a fiber treatment agent.

The water-soluble polyamides may be used singly or in a combination of two or more.

The lower limit of the amount of water-soluble polyamide used is 2 parts by mass or more, preferably 5 parts by mass or more, more preferably 7 parts by mass or more, and even more preferably 10 parts by mass or more, per 100 parts by mass of the water-insoluble polyamide. The upper limit of the amount of water-soluble polyamide is 50 parts by mass or less, preferably 30 parts by mass or less, and more preferably 25 parts by mass or less, per 100 parts by mass of the water-insoluble polyamide. The water-soluble polyamide can be used in an amount ranging from 2 to 50 parts by mass, preferably 5 to 30 parts by mass, more preferably 7 to 25 parts by mass, and even more preferably 10 to 25 parts by mass. When the water-soluble polyamide is used in an amount of less than 2 parts by mass, the film formed of the fiber treatment agent has a poor adhesion to the matrix resin. When the water-soluble polyamide is used in an amount of more than 50 parts by mass, water resistance is not imparted to the film formed of the fiber treatment agent.

There is no particular limitation on the melting point and glass transition temperature of the water-insoluble polyamide and water-soluble polyamide contained in the fiber treatment agent of the present invention. From the viewpoint of excellent compatibility and ease of obtaining a fiber treatment agent capable of forming on fibers a film that has excellent water resistance and excellent adhesion to the matrix resin of the present invention, a combination of a water-insoluble polyamide and a water-soluble polyamide whose glass transition temperature difference is not more than 100° C. is preferable, and a combination of a water-insoluble polyamide and a water-soluble polyamide whose glass transition temperature difference is not more than 50° C. is particularly preferable. As long as the glass transition temperature difference between the water-insoluble polyamide and water-soluble polyamide is within the above-mentioned range, which of the glass transition temperatures of the water-insoluble polyamide and water-soluble polyamide is higher is not restricted. Regardless of whether the water-insoluble polyamide or the water-soluble polyamide has a higher glass transition temperature, both cases are preferably used.

When the fiber treatment agent of the present invention comprises two or more types of water-insoluble polyamides and/or two or more types of water-soluble polyamides, the fiber treatment agent preferably contains at least one combination of a water-insoluble polyamide and a water-soluble polyamide that has a glass transition temperature difference of not more than 100° C. (more preferably not more than 50° C.). Still more preferably, all combinations of water-soluble and water-insoluble polyamides have a glass transition temperature difference of not more than 100° C. (more preferably not more than 50° C.)

The "glass transition temperature" as used herein refers to a value measured at a heating rate of 20° C./min using a differential scanning calorimeter (DSC) according to JIS K7121. It is a value obtained from the inflection point of the specific heat. Examples of differential scanning calorimeters (DSC) usable for this measurement include "DSC7020" (trade name) manufactured by SII NanoTechnology Inc., and the like.

The method for producing the fiber treatment agent of the present invention is not particularly limited. For example, the fiber treatment agent of the present invention can be produced by using a method comprising mixing an aqueous dispersion of a water-insoluble polyamide (an aqueous water-insoluble polyamide dispersion) with a water-soluble polyamide. Alternatively, a method comprising emulsifying a water-insoluble polyamide in the presence of a water-soluble polyamide to obtain an aqueous dispersion can also be used to produce the fiber treatment agent.

From the viewpoint of good standing stability of the obtained fiber treatment agent, a method for producing a fiber treatment agent of the present invention by separately preparing an aqueous water-insoluble polyamide dispersion and an aqueous water-soluble polyamide solution and mixing the dispersion and solution is particularly preferable. The mixing can be performed, for example, by stirring, thereby providing a more uniform solution (a fiber treatment agent). When an aqueous water-insoluble polyamide dispersion is mixed with an aqueous water-soluble polyamide solution, the addition of the aqueous water-soluble polyamide solution at 70° C. or less can produce a fiber treatment agent of the present invention having particularly excellent standing stability with less of an increase in viscosity.

The method for producing the aqueous water-insoluble polyamide dispersion is not particularly limited. Any method that can uniformly disperse a water-insoluble polyamide in an aqueous medium can be used.

Examples of such methods include a method comprising pulverizing a water-insoluble polyamide by a pulverization method such as mechanical grinding, freeze pulverization, or wet milling, and dispersing the resulting water-insoluble polyamide powder in an aqueous medium; a method of producing an aqueous dispersion by emulsifying a water-insoluble polyamide using a surfactant or the like; a method of producing an aqueous dispersion comprising neutralizing terminal carboxyl groups in the water-insoluble polyamide using a basic substance and self-emulsifying the polyamide; and the like.

In the present invention, from the viewpoint of being able to use a relatively simple device and the ease of controlling the particle size, a method comprising neutralizing terminal carboxyl groups in the water-insoluble polyamide with a basic substance, and self-neutralizing the polyamide is preferably used.

This method is explained in detail below.

In this method, for example, a water-insoluble polyamide, a basic substance, and an aqueous medium are placed in a container and a mixture of these components is prepared.

The container used to prepare the mixture is preferably a pressure-resistant container equipped with a heating means for heating a water-insoluble polyamide to a temperature at which the water-insoluble polyamide softens in an aqueous medium or to a higher temperature, and with a stirring means that can apply a shear stress to the contents of the container. For example, a pressure-resistant autoclave equipped with a stirrer, or the like is preferable.

Next, the mixture is heated to a temperature at or above the softening temperature of the water-insoluble polyamide, stirred, and emulsified to obtain an emulsion. Cooling the emulsion to room temperature yields an aqueous water-insoluble polyamide dispersion.

The water-soluble polyamide can be added at any stage of this process. For example, the water-soluble polyamide may be first added at the stage of preparing a mixture of a water-insoluble polyamide, a basic substance, and an aqueous medium. However, as described above, in the present invention, from the viewpoint of obtaining a fiber treatment agent with excellent standing stability, the water-soluble polyamide is preferably added after the terminal carboxyl groups in the water-insoluble polyamide are neutralized with a basic substance and an emulsion (an aqueous water-insoluble polyamide dispersion) is obtained by self-emulsification.

The aqueous medium is preferably water. Various types of water, such as tap water, industrial water, ion-exchanged water, deionized water, and pure water, can be used. In particular, deionized water and pure water are preferable. As long as the object of the present invention is not impaired, pH adjusters, viscosity modifiers, antifungal agents, defoaming agents, plasticizers, stabilizers, etc., may be added to the aqueous medium, if necessary.

The basic substance is not particularly limited. Examples of usable basic substances include alkali metal hydroxides, such as sodium hydroxide and potassium hydroxide, ammonia, and amine compounds. Such basic substances can be used singly or in a combination of two or more. Among these, from the viewpoint of excellent standing stability of the aqueous water-insoluble polyamide dispersion, sodium hydroxide and potassium hydroxide are particularly preferable.

From the viewpoint of excellent standing stability, such as little change over time in the viscosity of the obtained aqueous dispersion, the amount of the basic substance used is preferably 0.1 to 1.5 moles, and more preferably 0.4 to 1 mole, per mole of the terminal carboxyl groups of the water-insoluble polyamide. When the amount of the basic substance is 0.1 mole or more per mole of the terminal carboxyl groups of the water-insoluble polyamide, an aqueous dispersion tends to be easily obtained. When the amount of the basic substance is 1.5 moles or less, the obtained aqueous dispersion has better standing stability and does not become strong alkali, thus causing no environmental problems and being preferable.

The amount of the water-insoluble polyamide used is not particularly limited, and is preferably 0.1 to 80 parts by mass, and more preferably 20 to 70 parts by mass, per 100 parts by mass of the obtained aqueous water-insoluble polyamide dispersion.

As long as the object of the present invention is not impaired, the fiber treatment agent of the present invention may contain an antioxidant as desired. Addition of an antioxidant inhibits thermal degradation of the water-insoluble polyamide and water-soluble polyamide. When a fiber treatment agent comprising an antioxidant is used, the obtained fiber or fiber composite material may have improved mechanical properties, such as heat resistance.

The fiber treatment agent of the present invention may comprise a curing agent, if necessary. The use of a curing agent may improve the water resistance of the film formed of the fiber treatment agent of the present invention. Examples of usable curing agents include urea resins, melamine resins, phenolic resins, multi-epoxy resins, blocked isocyanates, and the like.

The total concentration of the water-insoluble polyamide and water-soluble polyamide in the fiber treatment agent of the present invention is preferably 0.1 to 80 mass %, and more preferably 1 to 60 mass %. A total polyamide concentration of 80 mass % or less is preferable in terms of stability of the aqueous dispersion. A total polyamide concentration of 0.1 mass % or more is preferable in terms of adhesion. The unit "mass %" used to express the polyamide concentration means "mass/mass %," unless specified otherwise. The same applies hereinafter.

The mean particle size of the water-insoluble polyamide dispersed in the fiber treatment agent of the present invention is preferably 0.05 to 20 μm, more preferably 0.1 to 15 μm, and even more preferably 0.2 to 10 μm. When the dispersed water-insoluble polyamide has a mean particle size of 0.05 μm or more, the treatment agent has a preferable viscosity and is easier to handle. A mean particle size of 20 μm or less is preferable from the viewpoint of the standing stability of the treatment agent, such as less of a tendency for polyamide particles to precipitate, and more uniform impregnation into fibers. The mean particle size is measured by the laser diffraction particle size distribution measurement method.

The fiber treatment agent of the present invention comprises a water-soluble polyamide as well as a water-insoluble polyamide. Since the water-soluble polyamide dissolves in an aqueous medium, the particle size of the water-soluble polyamide cannot be measured by the laser diffraction particle size distribution measurement method.

Accordingly, when the mean particle size of polyamide particles contained in the fiber treatment agent of the present invention is determined by the laser diffraction particle size distribution measurement method, the obtained value refers to the mean particle size of the water-insoluble polyamide dispersed in the fiber treatment agent of the present invention.

The calculation is made based on the following: the particle size of particles that exhibit the same diffracted/scattered light pattern as that of a 1-μm-diameter sphere is set to 1 μm, regardless of their shape.

The fiber treatment agent of the present invention has the following features: high compatibility with fibers, uniform and easy impregnation into fibers, and formation of a composite with excellent mechanical properties when adhered to a matrix resin.

There is no particular limitation on the fiber to be treated with the fiber treatment agent of the present invention. Examples of organic fibers include natural fibers obtained from plants and animals, such as cotton, hemp, flax, jute, sheep wool, and cashmere; synthetic fibers obtained by synthesizing organic chemicals, such as nylon 6, nylon 66, and like polyamide synthetic fibers, polyester synthetic fibers, polyacrylonitrile synthetic fibers, polyvinyl alcohol synthetic fibers, polyvinyl chloride synthetic fibers, polyvinylidene chloride synthetic fibers, polyethylene synthetic fibers, polypropylene synthetic fibers, and polyurethane synthetic fibers; semi-synthetic fibers, such as acetate and triacetate; and regenerated fibers, such as rayon and cuprammonium rayon. Examples of inorganic fibers include various fibers, such as carbon fibers (produced, for example, by carbonizing acrylic fiber or pitch as a starting material at a high temperature), glass fibers, metal fibers, and rock fibers.

Among such fibers, the fiber treatment agent of the present invention is advantageously used for carbon fibers because carbon fibers are highly compatible with the fiber treatment agent of the present invention, can be easily impregnated uniformly with the treatment agent, and can form a fiber matrix composite material with excellent mechanical properties when adhered to a matrix resin.

Specific examples of carbon fibers include polyacrylonitrile-based carbon fibers, rayon-based carbon fibers, lignin-based carbon fibers, pitch-based carbon fibers, vapor-grown carbon fibers, carbon nanotubes, and the like. The type of carbon fiber is not particularly limited as long as it is in the form of fibers. Polyacrylonitrile-based carbon fibers are preferably used from the viewpoint of low cost and good mechanical properties of the molded product obtained from carbon fiber bundles formed by bundling carbon fibers.

The form of carbon fibers may be any of continuous long fibers, short fibers obtained by cutting the continuous long fibers, milled yarns formed by milling fibers into a powder, etc. These can be suitably selected from various forms, such as woven fabrics, knitted materials, non-woven materials, and like sheets, according to the application and required properties.

The method of impregnating the fiber treatment agent into carbon fibers is not particularly limited. For example, a method comprising immersing carbon fibers in a fiber treatment agent-containing vessel and then withdrawing the carbon fibers therefrom, a method comprising dripping or spraying the treatment agent over carbon fibers, and other methods, such as a knife coating method, a roller dipping method, and a roller contact method, may be used. The amount of the fiber treatment agent attached to carbon fibers can also be controlled by adjusting the polyamide concentration in the treatment agent. Alternatively, the polyamide attached to the fiber surface may be wiped off by using a wringing controller or the like to control the amount of attachment.

After the fiber treatment agent is attached to carbon fibers, a drying treatment is subsequently performed to remove water, thus providing carbon fibers treated with the fiber treatment agent of the present invention. The drying method is not particularly limited. For example, a method using a heating medium, such as hot air, a hot plate, a roller, or an infrared heater, can be selected.

In the present invention, the temperature at which water is removed by drying after attaching the fiber treatment agent to carbon fiber is preferably 300° C. or less, and more preferably 250° C. or less, and particularly preferably 200° C. or less, from the viewpoint of obtaining a film with excellent adhesion to the matrix resin and reducing thermal degradation of the polyamide.

The amount of the fiber treatment agent of the present invention attached to the carbon fibers can be expressed as an increase in the mass of the treated carbon fibers from which water has been removed, per 100 parts by mass of the carbon fibers before treatment. The amount of the fiber treatment agent attached to the carbon fibers is preferably 0.1 to 20 parts by mass, and more preferably 1 to 15 parts by mass, per 100 parts by mass of the carbon fibers before the treatment. When the amount of the fiber treatment agent attached to the fibers is 20 parts by mass or less, softness of the carbon fibers is not impaired, and the treated carbon fibers are suitable for use. When the amount of the fiber treatment agent attached to the fibers is 0.1 parts by mass or more, a better adhesion is provided between the carbon fibers and a matrix resin upon mixture of the fibers and matrix resin to produce a carbon fiber composite material, and the obtained carbon fiber composite material has excellent mechanical properties, such as strength.

The carbon fibers treated with the fiber treatment agent of the present invention can be mixed with a matrix resin and used as a carbon fiber composite material. The matrix resin is not particularly limited, and both thermosetting resins and thermoplastic resins can be used. However, thermoplastic resins are preferable in view of their excellent compatibility with the carbon fiber treatment agent of the present invention, excellent mechanical properties of the obtained molded product, and recycling capability, as well as being able to perform press molding and injection molding, which have high molding efficiency.

Examples of thermoplastic resins include polyesters, such as polyethylene terephthalate and polybutylene terephthalate; polyolefins, such as polyethylene, polypropylene, and polybutylene; and styrene resins, polyoxymethylene, polyamide, polycarbonate, polymethylene methacrylate, polyvinyl chloride, polyphenylene sulfide, polyphenylene ether, polyimide, polyamideimide, polyetherimide, polysulfone, polyether sulphone, polyketone, polyether ketone, polyether ether ketone, polyarylate, polyethernitrile, phenol phenoxy resins, fluororesins, and the like. Other examples include polystyrene-based elastomers, polyolefin-based elastomers, polyurethane-based elastomers, saturated polyester-based elastomers, polyamide-based elastomers, polybutadiene-based elastomers, polyisoprene-based elastomers, fluorine-based elastomers, and like thermoplastic elastomers; copolymers thereof; modified products thereof; and mixed resins obtained by blending two or more of these resins.

Because the fiber treatment agent of the present invention can form, onto carbon fibers, a film having an excellent adhesion to a matrix resin, a carbon fiber composite material having good mechanical properties, such as strength and flexural properties, can be produced.

Although the fiber treatment agent of the present invention comprises a polyamide (water-soluble polyamide) having a property of absorbing water, a film formed of the fiber treatment agent of the present invention is water-resistant. Therefore, carbon fibers treated with the fiber treatment agent of the present invention are less likely to exhibit tackiness on the surface of the carbon fiber bundles due to moisture absorption and do not impair processability.

The phrase "the film is water-resistant" as used herein means that when the film formed by the fiber treatment agent is subjected to a water resistance test under the following conditions, less than 10% is eluted.

Water Resistance Test Conditions

After the fiber treatment agent is dried at 80° C. for 8 hours, the fiber treatment agent is transferred to a vacuum dryer and vacuum-dried for 72 hours (degree of vacuum: 1,013 hpa) to adjust the water content of the obtained film to less than 0.5%. Eight grams of the obtained film was placed in a square mold with a thickness of 0.3 mm and a length of 15 cm and then pressed using a hydraulic press at a heating temperature of 180° C. for 1 minute to form a film sheet with a thickness of about 0.3 mm. Subsequently, the film is cut to 4 cm×2 cm and used as a test piece for water resistance evaluation. After the mass of the test piece is precisely measured, the test piece is immersed (allowed to stand) in 30 g of deionized water at 80° C. for 8 hours, and the eluate is then separated by filtration through a polyethylene mesh (pore opening diameter: 177 μm). After the eluate is transferred to a vacuum drier and vacuum-dried for 72 hours (degree of vacuum: 1,013 hpa), the mass is measured. The amount (%) of the eluate, relative to the mass before impregnation with deionized water being set to 100, is defined as the elution rate.

When carbon fiber bundles are adhered to a matrix resin to produce a composite material, the influence of moisture absorbed by the treatment agent can be lowered. Accordingly, mechanical properties, such as strength and flexural elasticity, and the durability of the molded products are not impaired, and an excellent fiber composite material can be expected to be obtained.

This carbon fiber composite material can find a wide range of applications, such as structural materials for manufacturing automobiles and airplanes, sports-related products, and medical devices.

EXAMPLES

Examples illustrating the present invention and Comparative Examples are given below. However, the present invention is not limited thereto or thereby.

Example 1

A high-pressure autoclave with an inner volume of 1 liter equipped with turbine stirring blades with a diameter of 50 mm was charged with 240 g of nylon 6/66/12 copolymer (melting point: 120° C., terminal carboxyl group: 183 mmol/kg, glass transition temperature: 17° C.) as a polyamide, 145.4 g of deionized water, and 14.6 g of a 10% aqueous sodium hydroxide solution, and sealed.

Next, the stirrer was turned on. While stirring with the stirrer at 500 rpm, the autoclave was heated to an internal temperature of 160° C. While maintaining the internal temperature at 160° C., stirring was further continued for 30 minutes. Subsequently, the resulting mixture was cooled to room temperature while stirring and then 200 g of deionized water was added to obtain an aqueous polyamide dispersion (600 g). The mean particle size of polyamide particles in the aqueous dispersion was measured and found to be 0.6 μm. For the measurement of the mean particle size, a laser diffraction particle size analyzer (trade name "SALD-2000J," produced by Shimadzu Corporation) was used. Hereinafter, the same analyzer was used to measure the mean particle size.

Sixty-four grams of a 50 mass % aqueous water-soluble polyamide solution (trade name: "AQ nylon T-70," produced by Toray Industries, Inc., a water-soluble nylon resin containing a nitrogen cyclic compound and polyalkylene glycol, glass transition temperature: −22° C.) was added to 400 g of this aqueous polyamide dispersion. The resulting mixture was mixed and stirred at 25° C. for 3 hours to obtain a fiber treatment agent of the present invention. The mean particle size of polyamide particles of the obtained fiber treatment agent was measured and found to be 0.6 μm.

Example 2

The procedure of Example 1 was repeated except that 16 g of the 50 mass % aqueous water-soluble polyamide solution was used. A fiber treatment agent according to the present invention was thereby obtained. The mean particle size of polyamide particles of this fiber treatment agent was measured and found to be 0.6 μm.

Example 3

The procedure of Example 1 was repeated except that 32 g of the 50 mass % aqueous water-soluble polyamide solution was used. A fiber treatment agent according to the present invention was thereby obtained. The mean particle size of polyamide particles of this fiber treatment agent was measured and found to be 0.6 μm.

Example 4

The procedure of Example 1 was repeated except that 112 g of the 50 mass % aqueous water-soluble polyamide solution was used. A fiber treatment agent according to the present invention was thereby obtained. The mean particle size of polyamide particles of this fiber treatment agent was measured and found to be 0.6 μm.

Example 5

The procedure of Example 1 was repeated except that an aqueous solution prepared by dissolving "AQ nylon A-90" (trade name, produced by Toray Industries, Inc., a water-soluble nylon resin containing a nitrogen cyclic compound, glass transition temperature: 47° C.) in deionized water to adjust the concentration to 50 mass % was used in place of the 50 mass % aqueous water-soluble polyamide solution used in Example 1. A fiber treatment agent according to the present invention was thereby obtained. The mean particle size of polyamide particles of this fiber treatment agent was measured and found to be 0.6 μm.

Example 6

The procedure of Example 1 was repeated except that an aqueous solution prepared by dissolving "AQ nylon P-70" (trade name, produced by Toray Industries, Inc., a water-soluble nylon resin containing a polyalkylene glycol, glass transition temperature: −46° C.) in deionized water to adjust the concentration to 50 mass % was used in place of the 50 mass % aqueous water-soluble polyamide solution used in Example 1. A fiber treatment agent according to the present invention was thereby obtained. The mean particle size of polyamide particles of this fiber treatment agent was measured and found to be 0.6 μm.

Example 7

The procedure of Example 1 was repeated except that 177.8 g of an 18 mass % aqueous water-soluble polyamide solution (trade name "Toresin FS-350E5AS," produced by Nagase ChemteX Corporation, a modified N-methoxymethylated nylon, glass transition temperature: 8° C.) was used in place of the 50 mass % aqueous water-soluble polyamide solution. A fiber treatment agent according to the present invention was thereby obtained. The mean particle size of polyamide particles of this fiber treatment agent was measured and found to be 0.6 μm.

Comparative Example 1

The procedure of Example 1 was repeated except that the 50 mass % aqueous water-soluble polyamide solution was not used. A fiber treatment agent was thereby obtained.

Comparative Example 2

The 50 mass % aqueous water-soluble polyamide solution used in Example 1 was used, without modification, as a fiber treatment agent.

Comparative Example 3

The procedure of Example 1 was repeated except that 256 g of the 50 mass % aqueous water-soluble polyamide solution was used. A fiber treatment agent was thereby obtained.
Evaluation of the Fiber Treatment Agents The fiber treatment agents obtained in Examples 1 to 7 and Comparative Examples 1 to 3 were diluted with deionized water to a solids concentration (polyamide concentration) of 8 mass %.

Subsequently, after a carbon fiber bundle (trade name "Pyrofil TR50S15L," produced by Mitsubishi Rayon Co., Ltd., number of filaments: 15,000, filament diameter: 7 μm, weight: 1,000 mg/m) wound on a bobbin was unwound from the bobbin, the unwound fiber was sequentially immersed in an impregnation vessel containing 1 L of each fiber treatment agent by roller immersion, followed by hot air drying (160° C., 5 minutes). Wringing after immersion was adjusted so that the amount of fiber treatment agent attached to the carbon fiber bundle after hot air drying was 3 parts by mass per 100 parts by mass of the carbon fiber bundle before the attachment.
Adhesion Evaluation The obtained carbon fiber bundle was placed on a nylon 6 sheet (length: 25 cm, width: 3.5 cm, thickness: 0.5 mm) and heat-sealed at 0.2 MPa for 30 seconds (adhesion area: 0.6 cm²) using a press (trade name "Heat Gradient Tester," produced by Toyo Seiki Seisaku-sho) at a heating temperature of 240° C. The resulting product was cut to prepare a test piece. With reference to JIS K 6850, the tensile shear strength of the carbon fiber bundle and nylon 6 sheet was measured using an autograph (trade name "AGS-J," produced by Shimadzu Corporation) at a pulling rate of 3 mm/min. This measurement was repeated 6 times to calculate the average. Table 1 shows the results. When the tensile shear strength is 7.0 MPa or more, the adhesion is determined to be excellent. When the tensile shear strength is 7.5 MPa or more, the adhesion is determined to be particularly excellent.
Water Resistance Evaluation The fiber treatment agents obtained in Examples 1 to 7 and Comparative Examples 1 to 3 were placed in deep trays made of Teflon. The trays were placed in a hot air dryer and dried at 80° C. for 8 hours. The fiber treatment agents were then transferred to a vacuum dryer and vacuum-dried for 72 hours (degree of vacuum: 1,013 hpa) to adjust the water content of the obtained films to less than 0.5%. Eight grams of each of the obtained films was placed in a square mold with a thickness of 0.3 mm and a length of 15 cm and then pressed using a hydraulic press at a heating temperature of 180° C. for 1 minute to form a film sheet with a thickness of 0.3 mm. Subsequently, the film was cut to 4 cm×2 cm (about 0.3 g) to obtain a test piece for water resistance evaluation. The film sheet obtained using the film of Comparative Example 2 was too soft to maintain the shape of 4 cm×2 cm, and about 0.3 g of the sheet was cut and used as a test piece.

After the mass of each test piece was measured precisely, each test piece was immersed in 30 g of deionized water at 80° C., and the eluate was then separated by filtration through a polyethylene mesh (trade name "PE120," produced by Nippon Tokushu Fabric Inc., pore opening diameter: 177 μm). After the eluate was transferred to a vacuum drier and vacuum-dried for 72 hours (degree of vacuum: 1,013 hpa), the mass was measured. The amount (%) of the eluate, relative to the mass before impregnation with deionized water being set to 100, is shown. This amount indicates elution rate (%). This measurement was repeated 5 times to calculate the average. Table 1 shows the results. When the elution rate (%) is less than 10, the test piece is water-resistant, and the film formed of the fiber treatment agent is thus determined to have good water resistance.

TABLE 1

|  | Adhesion Evaluation Tensile shear strength (Mpa) | Water resistance Evaluation Elution rate (%) |
| --- | --- | --- |
| Example 1 | 8.1 | 2 |
| Example 2 | 7.2 | 1 |
| Example 3 | 7.6 | 2 |
| Example 4 | 7.2 | 4 |
| Example 5 | 8.1 | 1 |
| Example 6 | 7.1 | 2 |
| Example 7 | 7.2 | 7 |
| Comp. Ex. 1 | 5.2 | 1 |
| Comp. Ex. 2 | 6.3 | 100 |
| Comp. Ex. 3 | 6.5 | 86 |

Table 1 reveals that the films formed of the fiber treatment agents of the present invention have excellent adhesion to the matrix resin, and that the fiber treatment agents of the present invention can form on carbon fibers a film with excellent water resistance and strength.

In contrast, the film formed of the water-soluble polyamide-free fiber treatment agent of Comparative Example 1 had inferior adhesion to the matrix resin although it had excellent water resistance. Further, the film formed of the fiber treatment agent consisting of the water-soluble polyamide of Comparative Example 2 not only had slightly inferior adhesion but also easily dissolved in water as expected. Most of the film obtained in Comparative Example 3 also dissolved in water and the shape of the film greatly changed. The results of Examples 1 to 7 of the present invention and Comparative Example 3 revealed that only the films formed of fiber treatment agents comprising the water-insoluble polyamide and a specific amount of the water-soluble polyamide according to the present invention achieved both satisfactory adhesion and water resistance.

Although the reason why the film formed of the fiber treatment agent of the present invention comprising a water-insoluble polyamide and a specific amount of a water-soluble polyamide exhibits excellent performance is not clear, the following can be presumed (however, a restrictive interpretation of the present invention is not desired). Excellent adhesion is provided because the water-soluble polyamide contained in the film slightly reduces the crystallinity of the film-forming polyamide to thereby lower the cohesive strength and instead slightly imparted tackiness to the film, thus stabilizing the adhesion surface between the film and the matrix resin on the fiber surface. The reason why containing a water-soluble polyamide in an amount less than a specific amount does not impair water resistance is presumed to be as follows: amino groups or carboxyl groups that are present at the ends of the water-insoluble polyamide and water-soluble polyamide react with each other and a crosslinking reaction occurs, thus enhancing the water resistance of the film.

The above results clearly show that the fiber treatment agent of the present invention, which even contains a water-soluble polyamide, can form a film that has excellent water resistance and good adhesion to a matrix resin. Accordingly, when the fiber treatment agent of the present invention is used to produce a fiber composite material, the influence of moisture absorbed by the fiber treatment agent used can be reduced without using a curing agent or heating, whereby a fiber composite material with excellent processability as well as with excellent mechanical properties, such as strength and flexural elasticity, and the durability of the molded product can be expected to be obtained.

The invention claimed is:

1. A fiber treatment agent comprising an aqueous medium, a basic substance, a water-insoluble polyamide dispersed in the aqueous medium, and a water-soluble polyamide that is present in an amount of 2 to 50 parts by mass per 100 parts by mass of the water-insoluble polyamide,
wherein the basic substance is at least one member selected from the group consisting of alkali metal hydroxides and ammonia.

2. The fiber treatment agent according to claim 1, wherein the water-insoluble polyamide is at least one member selected from the group consisting of nylon 6, nylon 66, nylon 610, nylon 11, nylon 12, nylon 6/66 copolymer, nylon 6/610 copolymer, nylon 6/11 copolymer, nylon 6/12 copolymer, nylon 6/66/11 copolymer, nylon 6/66/12 copolymer, nylon 6/66/11/12 copolymer, nylon 6/66/610/11/12 copolymer, dimer acid-based polyamide resins, and nylon elastomers.

3. The fiber treatment agent according to claim 2, which, upon drying, forms a film that is water-resistant.

4. The fiber treatment agent according to claim 1, wherein the dispersed water-insoluble polyamide has a mean particle size of 0.05 to 20 µm.

5. The fiber treatment agent according to claim 4, which, upon drying, forms a film that is water-resistant.

6. The fiber treatment agent according to claim 1, wherein the water-soluble polyamide comprises a tertiary amine component or a polyalkylene glycol component in its molecular chain.

7. The fiber treatment agent according to claim 6, which, upon drying, forms a film that is water-resistant.

8. The fiber treatment agent according to claim 1, wherein the water-insoluble polyamide and the water-soluble polyamide have glass transition temperatures with a difference that is not more than 100° C.

9. The fiber treatment agent according to claim 8, which, upon drying, forms a film that is water-resistant.

10. The fiber treatment agent according to claim 1, which is a treatment agent for carbon fibers.

11. A carbon fiber treated with the fiber treatment agent according to claim 1.

12. A carbon fiber composite material comprising the carbon fiber according to claim 11 and a matrix resin.

13. A method for producing a carbon fiber treated with a fiber treatment agent, comprising treating the carbon fiber with the fiber treatment agent according to claim 1 at a temperature of 200° C. or lower.

14. The fiber treatment agent according to claim 1, which, upon drying, forms a film that is water-resistant.

15. A method for producing a fiber treatment agent, comprising adding a water-soluble polyamide to an emulsified aqueous dispersion of a water-insoluble polyamide, the emulsified aqueous dispersion containing a basic substance , at a temperature of 70° C. or lower, the emulsified aqueous dispersion being obtained by heating to a temperature at or above the softening temperature of the water-insoluble polyamide,
wherein the basic substance is at least one member selected from the group consisting of alkali metal hydroxides and ammonia.

* * * * *